United States Patent
Xie et al.

(10) Patent No.: US 8,236,129 B2
(45) Date of Patent: Aug. 7, 2012

(54) ATTACHMENT PAD WITH THERMAL REVERSIBLE ADHESIVE AND METHODS OF MAKING AND USING THE SAME

(75) Inventors: Tao Xie, Troy, MI (US); Xingcheng Xiao, Madison Heights, MI (US); Ruomiao Wang, Warren, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1042 days.

(21) Appl. No.: 12/105,865

(22) Filed: Apr. 18, 2008

(65) Prior Publication Data
US 2008/0289757 A1    Nov. 27, 2008

Related U.S. Application Data

(60) Provisional application No. 60/939,683, filed on May 23, 2007.

(51) Int. Cl.
C09J 5/00 (2006.01)
C04B 37/00 (2006.01)
B29C 65/00 (2006.01)
B29C 65/10 (2006.01)
B32B 37/00 (2006.01)
H01L 21/677 (2006.01)

(52) U.S. Cl. ......... 156/325; 156/311; 156/499; 414/800

(58) Field of Classification Search .................. 156/311, 156/325, 499; 414/800
See application file for complete search history.

(56) References Cited

U.S. PATENT DOCUMENTS

| | | | |
|---|---|---|---|
| 4,488,335 A * | 12/1984 | Fox et al. .................. | 24/304 |
| 5,755,913 A | 5/1998 | Liaw et al. | |
| 6,759,481 B2 | 7/2004 | Tong | |
| 6,773,535 B1 | 8/2004 | Wetzel | |
| 6,827,325 B2 | 12/2004 | Hofmann et al. | |
| 6,986,855 B1 | 1/2006 | Hood et al. | |
| 7,188,498 B2 | 3/2007 | Browne et al. | |
| 2001/0047579 A1 | 12/2001 | Lee et al. | |
| 2004/0117955 A1* | 6/2004 | Barvosa-Carter et al. ...... | 24/442 |
| 2005/0151385 A1 | 7/2005 | Autumn et al. | |
| 2005/0167556 A1 | 8/2005 | Fontana et al. | |
| 2005/0240190 A1 | 10/2005 | Gall et al. | |
| 2005/0274455 A1 | 12/2005 | Extrand | |
| 2006/0036045 A1 | 2/2006 | Wilson et al. | |
| 2006/0156535 A1 | 7/2006 | Browne et al. | |
| 2007/0073130 A1 | 3/2007 | Finch et al. | |
| 2007/0289786 A1 | 12/2007 | Cutkosky et al. | |

OTHER PUBLICATIONS

Nelson et al., Shape Recovery of Nanoscale Imprints in a Thermoset "Shape Memory" Polymer, Applied Physics Letters, 2005, 86, 103108.
Lendlein et al., Shape-Memory Polymers, Angewandte Chem. Int. Ed., 2002, pp. 2034-2057, vol. 41.

(Continued)

*Primary Examiner* — Michael Orlando
(74) *Attorney, Agent, or Firm* — BrooksGroup

(57) ABSTRACT

One embodiment provides an attachment pad including a multilayer thermo-reversible adhesive including a shape memory polymer layer and a dry adhesive layer underlying the shape memory polymer layer, the multilayer thermo-reversible adhesive having a curved surface when the shape memory polymer layer is below its glass transition temperature and unaffected by a load; and a means for evenly applying a load and/or detaching force on the perimeter of the multilayer thermo-reversible adhesive including a spring.

7 Claims, 1 Drawing Sheet

OTHER PUBLICATIONS

Xie et al., Self-Peeling Reversible Dry Adhesive System, Chem. Mater., 2009. pp. 2866-2868, vol. 20.

Liu et al., Chemically Cross-Linked Polycyclooctene: Synthesis, Characterization and Shape Memory Behavior, Macromolecules, 2002. pp. 9868-9874, vol. 35.

Lendlein et al., Biodegradable, Elastic Shape-Memory Polymers for Potential Biomedical Applications, Science, May 31, 2002, pp. 1673-1676, vol. 296.

Lee et al., Structure and Thermomechanical Properties of Polyurethane Block Copolymers with Shape Memory Effect, Macromolecules, 2001, pp. 6431-6437, vol. 34.

Lin et al., Study on Shape-Memory Behavior of Polyether-Based Polyurethanes. I. Influence of the Hard-Segment Content, J. of Applied Polymer Science, 1998, pp. 1563-1574, V.69.

Lin et al., Study on Shape-Memory Behavior of Polyether-Based Polyurethanes. II. Influence of Soft-Segment Molecular Weight, J. of App. Polymer Science, 1998, pp. 1575-1586, 69.

EPON Resin 828 Structural Reference Manual, Shell Chemicals, Houston, TX.

Gall et al., Shape Memory Polymer Nanocomposites, Acta Materialia, 2002, pp. 5115-5126, vol. 50.

Gall et al., Internal Stress Storage in Shape Memory Polymer Nanocomposites, Applied Physics Letter, Jul. 12, 2004, pp. 290-292, vol. 85, No. 2.

Xu et al., Synthesis and Shape Memory Effects of Si-O-Si Cross-Linked Hybrid Polyurethanes, Polymer, 2006, pp. 457-465, vol. 47.

Crystallisation of Liquid DGEBPA and DGEBPF Epoxy Resins, Resolution Performance Products, Product Bulletin, SC:2365-01, Jul. 2001.

Jeffamine D-230 Polyetheramine, Technical Bulletin, Huntsman Corporation, Copyright 2006.

Xie et al., Self-Peeling Reversible Dry Adhesive System, Materials, & Processes Laboratory, General Motors Research & Development Center, Chem. Mater. 2008,vol. 20, pp. 2866-2.

Aubert et al., Thermally Removable Epoxy Adhesives Incorporating Thermally Reversible Diels-Alder Adducts, The Journal of Adhesion, 2003, vol. 79, pp. 609-616.

International Search Report and Written Opinion, International Application No. PCT/US/2008/060796 Filed Apr. 18, 2008, Appicant GM Global Technology Operations, Inc.

Unver et al., Geckbot: A Gecko Inspired Climbing Robot Using Elastomer Adhesives.

Daltorio et al., A Small Wall-Walking Robot with Compliant, Adhesive, Feet, IEEE/RSJ International Conference on Intelligent Robots and Systems, 2005, pp. 4018-4023.

International Search Report and Written Opinon, International Application No. PCT/US2008/060826 filed Apr. 18, 2008, Applicant GM Global Technology Operations, Inc.

Lee et al., A Reversible Wet/Dry Adhesive Inspired by Mussels and Geckos, Nature, Jul. 19, 2007, pp. 338-342, vol. 448.

Lee et al., Single-Molecule Mechanics of Mussel Adhesion, PNAS, Aug. 29, 2005, pp. 12999-13-3, vol. 103, No. 35.

Veriflex Shape Memory Polymer, http://www.crgrp.net/veriflex.shtml, Cornerstone Research Group, Inc., 2003-2007.

Shape Memory Polymer, http://crgnp.net/success-stories.shtml, Cornerstone Research Group, Inc., 2003-2007.

TEMBO Shape Memory Polymers and Elastic Memory Composite (EMC) Material, http://www.ctd-materials.com/products/emc.htm, Cornerstone Research Group, Inc., 2003-2007.

Behl et al., Shape-Memory Polymers: Dual Shape Materials for Bio-medical Applications, A. Mater. Today, 2007, vol. 10, pp. 1- 20.

Bellin et al., Polymeric Triple-Shape Materials, PNAS, Nov. 28, 2006, vol. 103, No. 48, pp. 18043-18047.

Chung et al., Two-Way Reversible Shape Memory in a Semicrystalline Network, Macromolecules, 2008, vol. 41, pp. 184-192.

Rousseau et al., Shape Memory Effect Exhibited by Smectic-C Liquid Crystalline Elastomers, J. Am. Chem. Soc., 2003, vol. 125, pp. 15300-15301.

Liu et al., Review of Progress in Shape-Memory Polymers, Journal of Materials Chemistry, 2007, vol. 17, pp. 1543-1558.

Dietsch et al., a Review—Features and Benefits of Shape Memory Polymers (SMPs), Journal of Advanced Materials, Apr. 2007, vol. 39, No. 2, pp. 3-12.

Li et al., Shape Memory Effect of Ethylene—Vinyl Acetate Copolymers, Journal of Applied Polymer Science, 1999, vol. 71, pp. 1063-1070.

Liu et al., Novel Shape-Memory Polymer with Two Transition Temperatures, Macromol. Rapid Commun., 2005, vol. 26, pp. 649-652.

Reyntjens et al., Polymer Networks Containign Crystallizable Poly(octadecyl vinyl ether) Segments for Shape-Memory Materials, Macromol. Rapid Commun., 1999, vol. 20,pp. 251-255.

Jiang et al., Polymers Move in Response to Light, Advanced Materials., 2006, vol. 18, pp. 1471-1475.

Huang et al., Water-Driven Programmable Polyurethane Shape Memory Polymer: Demonstration and Mechanism, Applied Physical Letters, 2005, vol. 86, pp. 114105-1-3.

Lendlein et al., Light-Induced Shape-Memory Polymers, Nature, Apr. 14, 2005, vol. 434, pp. 879-882.

Goethals et al., Poly(vinyl ethers) as Building Blocks for New Materials, Macromol. Symp. 1998, vol. 132, pp. 57-64.

Xiao, U.S. Appl. No. 12/273,083, Self-Healing and Scratch Resistant Shape Memory Polymer System, filed Nov. 18, 2008.

Xie, U.S. Appl. No. 11/867,531, Reversible Dry Adhesives, filed Oct. 4, 2007.

Xie, U.S. Appl. No. 12/396,045, Polymer Systems with Multiple Shape Memory Effect, filed Mar. 2, 2009.

Xie, U.S. Appl. No. 12/367,826, A Reversible Welding Process for Polymers, filed Feb. 9, 2009.

Xie, U.S. Appl. No. 12/178,844, High Strength Reversible Noncovalent Adhesion Methods for a Solid Polymer-Polymer Interface, filed Jul. 24, 2008.

Cheng, U.S. Appl. No. 12/359,709, Remote Activation of Thermo-Reversible Dry Adhesives, filed Jan. 26, 2009.

Xie, U.S. Appl. No. 12/423,947, Shape Memory Polymer and Adhesive Combination and Methods of Making and Using the Same, filed Apr. 15, 2009.

Xie, U.S. Appl. No. 12/432,211, Shape Memor Polymers with Surface Having Dangling Adhesive Polymeric Chains and Methods of Making and Using the Same, filed Apr. 29, 2009.

Xie, U.S. Appl. No. 12/181,562, Polymer Systems with Multiple Shape Memory Effect, filed Jul. 29, 2008.

Xie, U.S. Appl. No. 11/867,549, Method of Miniimizing Residue Adhesion for Thermo-Reversible Dry Adhesives, filed Oct. 4, 2007.

Xie, U.S. Appl. No. 12/105,865, Attachment Pad with Thermal Reversible Adhesive and Methods of Making and Using the Same, filed Apr. 18, 2008.

Xie, U.S. Appl. No. 11/867,558, Multilayer Adhesive for Thermal Reversible Joining of Substrates, filed Oct. 4, 2007.

Xie, U.S. Appl. No. 12/391,704, Reversible Dry Adhesives for Wet adn Dry Conditions, filed Feb. 24, 2009.

Xie, U.S. Appl. No. 12/105,749, Method for Robotic Handling Using Thermo-Reversible Dry Adhesives, filed Apr. 18, 2008.

Xie, U.S. Appl. No. 12/105,788, Climbing Devices Based on Thermo-Reversible Dry Adhesives, filed Apr. 18, 2008.

Xie, USSN Oct. 4, 2007, Shape Memory Epoxy Polymers, filed Oct. 4, 2007.

* cited by examiner

ATTACHMENT PAD WITH THERMAL REVERSIBLE ADHESIVE AND METHODS OF MAKING AND USING THE SAME

This application claims the benefit of U.S. Provisional Application No. 60/939,683, filed May 23, 2007.

TECHNICAL FIELD

The field to which the disclosure generally relates includes a pad for attaching to an object and methods of making and using the same.

BACKGROUND

Gecko feet pads, with nanohair structures on them, are examples of smart dry adhesives. The working principle of the Gecko adhesion is that the nanohair structure allows the foot pad to make maximum contact with a counter surface regardless of its roughness and chemical composition. This is accomplished by nanohairs that are relatively long and protruding from the foot pad at an angle so that adjacent nanohairs can contact the counter surface regardless of its topography. The maximum contact further allows for accumulation of millions of small van der Waals (in the range of microNewtons) interactions between the Gecko foot pad and the counter surface, leading to an overall adhesion force (pull-off force) of about 10 N/cm$^2$. When the detaching force is employed in a peel-off mode, however, the complete detachment is achieved gradually by overcoming small adhesion forces corresponding to very small areas. Thus, the adhesion is easily reversed. Overall, the attractiveness of the Gecko adhesion lies in the combination of adhesive strength (10 N/cm$^2$), reversibility, and the ability to adapt to a variety of surfaces in terms of both the surface roughness and composition. The above unique features of the Gecko adhesion has stimulated scientific research efforts to produce synthetic smart dry adhesives that work using the same principle as the Gecko feet. Up to now, the two best synthetic Gecko adhesives show maximum pull-off strength of 3 and 10 N/cm$^2$ towards glass. Both adhesives suffer from severe adhesion loss after only one or two attaching/detaching cycles, as a result of breakdown of the nano structures or lateral collapse of the nano structures, with the latter referring to the bonding of adjacent nano-hairs. In addition, typical synthetic Gecko adhesives are expensive to produce and large-scale manufacturing is practically too difficult.

SUMMARY OF EXEMPLARY EMBODIMENTS OF THE INVENTION

One embodiment provides an attachment pad including a multilayer thermo-reversible adhesive including a shape memory polymer layer and a dry adhesive layer underlying the shape memory polymer layer, the multilayer thermo-reversible adhesive having a curved surface when the shape memory polymer layer is below its glass transition temperature and unaffected by a load; and a means for evenly applying a load on the perimeter of the multilayer thermo-reversible adhesive including a spring.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 2:
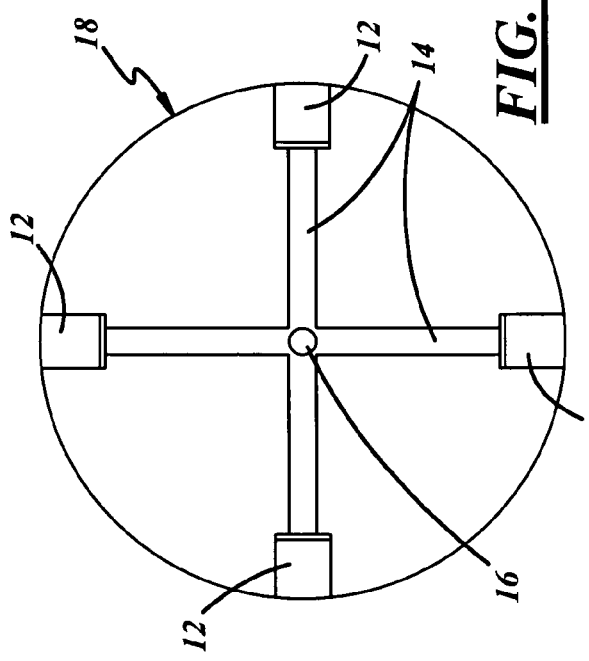
FIG. 2 is a top view of an attachment pad according to one embodiment of the invention.
Figure 1:
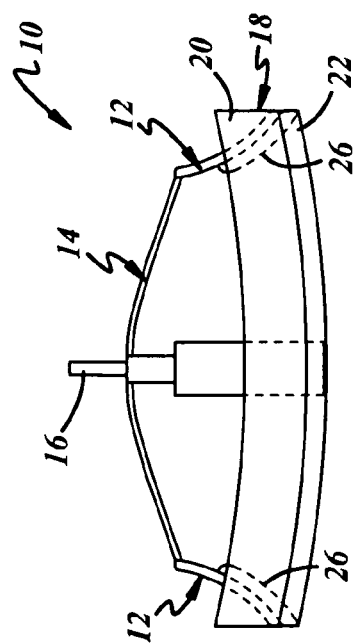
FIG. 1 is a side view of an attachment pad, according to one embodiment of the invention.

Referring now to FIGS. 1-2, one embodiment of the invention includes an attachment pad 10 for attaching to another object. The attachment pad 10 may be at the end of a robot arm and may be utilized to climb a variety of surfaces, such as a wall. Alternatively, the attachment pad 10 may be utilized to attach one object to another object including, but not limited to, the attachment of a robot arm to an object to move the object from one place to another.

The attachment pad 10 may include a multilayer thermo-reversible adhesive 18 including a shape memory polymer layer 20 and a dry adhesive layer 22 underlying the shape memory polymer layer 20. A plurality of springs or spring clips 12 may be attached to the multilayer thermo-reversible adhesive 18 constructed and arranged to apply a load to the multilayer thermo-reversible adhesive 18 at appropriate points. The attachment pad 10 may include any suitable number of springs 20. In one embodiment, the attachment pad 10 may include four springs 20. In another embodiment, the attachment pad 10 may include two springs 20. The springs or spring clips 12 may be comprised of any suitable metal or metal alloy.

In one embodiment, the springs 12 may be attached to the multilayer thermo-reversible adhesive 18 through molding. The springs 12 may be connected together by a bridge 14 which may also have a spring or elastic characteristic. The bridge 14 may be comprised of any suitable material. In one embodiment, each pair of springs 12 may be connected together by a bridge 14. A rod 16 may be connected to the bridge 14 at a central location to apply force evenly over the periphery of the multilayer thermo-reversible adhesive 18 through the bridge 14 and attached springs 12. The rod 16 may be comprised of any suitable material. In one embodiment the rod 16 may connect all of the bridges 14. Heating elements 26 may be provided on the springs 12 or a resistive heater element may overlie at least a portion of the multilayer thermo-reversible adhesive 18 to heat the same as desired. In various embodiments heating may be accomplished by induction heating or by wires in the shape memory polymer layer 20.

The multilayer thermo-reversible adhesive 18 may have a curved surface, particularly the adhesive layer 22 thereof, when the shape memory polymer layer 20 is at a temperature below the glass transition temperature ($T_g$) thereof and not under a load. In various embodiments, the $T_g$ of the shape memory polymer layer 20 may be 25° C. to 200° C.

Figure 3C:
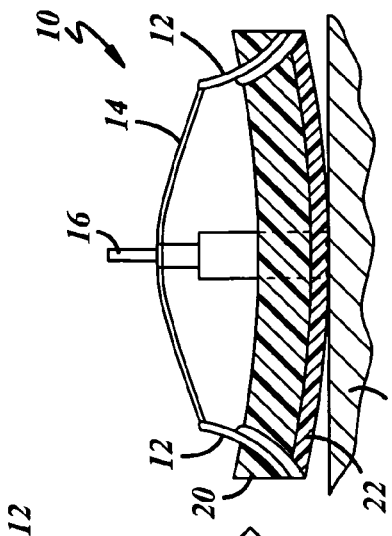
FIG. 3C shows a method according to one embodiment of the invention.
Figure 3B:
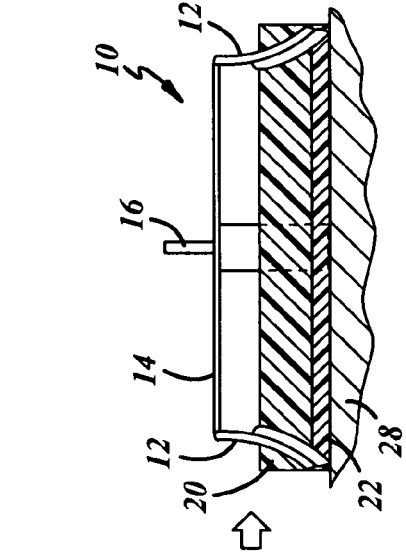
FIG. 3B shows a method according to one embodiment of the invention.
Figure 3A:
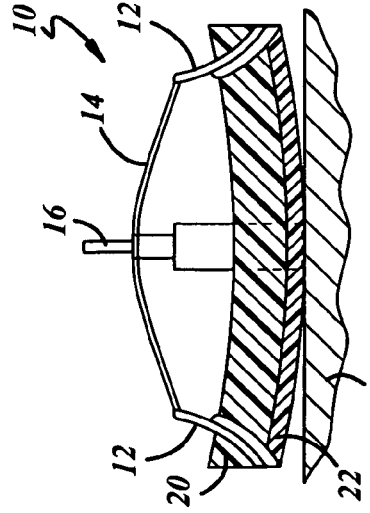
FIG. 3A shows a method according to one embodiment of the invention.

In one embodiment, a method is provided for forming a bond to a substrate or wall 28, as shown in FIGS. 3A-3C. FIG. 3A shows the attachment pad 10 including the multilayer thermo-reversible adhesive 18 positioned over the wall 28. The multilayer thermo-reversible adhesive 18 is heated to a temperature above the $T_g$ of the shape memory polymer 20. A force is applied by the rod 16 and distributed on all of the spring clips 12, providing an even load on the perimeter of the thermo-reversible adhesive 18 to ensure maximum bonding. FIG. 3B shows the attachment pad 10 with the multilayer thermo-reversible adhesive 18 bonded to the wall 28. To detach from the wall 28, the multilayer thermo-reversible adhesive 18 is heated again above the $T_g$ of the shape memory polymer 20, with no load imposed by the springs 12. A peeling force may be imposed by the springs 12. The surface profile will return to its original natural curvature, as shown in FIG. 3C, and adhesion reversal will be achieved.

Thus according to one embodiment of the invention a curved structure is provided consisting of a dry adhesive layer 22 and a layer of shape memory polymer 20. By heating to a temperature higher than the $T_g$ of the shape memory polymer, and imposing a load while cooling to a temperature below the $T_g$, the double layer structure forms a strong adhesive bond with a substrate, for example but not limited to a stainless steel substrate, with a pull-off force greater than 60 N/cm². The strong bond may be automatically released by heating the curved structure to a temperature above the $T_g$ of the shape memory polymer.

One embodiment of the invention includes a robot having the attachment pad 10 including the multilayer thermo-reversible adhesive 18 on the tip of a robot arm or leg. A heating and/or cooling wire may be provided and embedded in the robot arm or merely attached to the dry adhesive. To pick up a part, the multilayer thermo-reversible adhesive 18 may be heated by a brief electrical current and then pressed against the intended part to make contact. The multilayer thermo-reversible adhesive 18 may be cooled either by natural cooling or using a cooling wire. This causes a strong adhesive bond to be formed with a pull-off force of approximately 60 N/cm² but which may vary depending upon the part. The robot arm may be controlled to carry the part to a target location. The part may be released by heating the dry adhesive again using electrical current. In one embodiment, the detachment requires only a relatively small force of about 0.5 N/cm².

In another embodiment a Peltier thermal electric device which is capable of both heating and cooling may be utilized to heat and cool the thermo-reversible dry adhesive. The Peltier device may include a PN junction and may be constructed and arranged so that current flowing through the PN junction in one direction causes the device to heat one side thereof and current flowing through the PN junction in the opposite direction causes one side thereof to cool the device.

Another embodiment of the invention includes moving or climbing devices using more than one movable arm or leg with the attachment pad 10 including the multilayer thermo-reversible adhesive 18 thereon. A means for heating and/or cooling the thermo-reversible dry adhesive may be provided such as, but not limited to, a heating wire or cooling wire or a Peltier device. To attach the arm or leg to a target counter surface (e.g. wall), the dry adhesive may be heated by brief electrical current through the heating wire and the adhesive is brought into contact with the wall. The adhesive is cooled by natural cooling or using the cooling wire or a Peltier device to form a strong bond with the wall. To detach the arm or leg from the wall, the dry adhesive is heated again and a relatively small pull-off or peel-off force is applied.

For the whole device to climb, several steps are involved. In one embodiment, the device may have two arms. The first arm is detached from the wall with the second arm attached to the wall. The first arm is moved to a new location and attached to the wall. The second arm is detached from the wall and is moved upward on the wall and attached. The first arm is detached and moved up on the wall and attached. The process is repeated so that the device climbs the wall.

The adhesive layer may provide a continuous contact surface or the adhesive layer may include a plurality of spaced apart fingers each providing a relative small contact surface so the overall contact surface of the adhesive layer is not continuous.

Another embodiment of the invention includes a method comprising heating an attachment pad 10 including the multilayer thermo-reversible adhesive 18 having a curved structure at room temperature and applying a load to the adhesive so that the adhesive adheres to an underlying substrate so that the adhered adhesive has a pull-off force greater than 10 N/cm², and thereafter detaching the adhesive comprising heating the adhesive to a temperature above the glass transition temperature of the shape memory polymer layer to cause the adhesive to return to a curved structure.

In various embodiments, the dry adhesive layer may be an epoxy elastomeric dry adhesive. In various embodiments, the shape memory polymer layer may be an epoxy shape memory polymer. In various embodiments, the components of the dry adhesive or the components of the shape memory polymer may include a rigid epoxy and a flexible epoxy. The range of possible crosslinking chemistries which may be used to achieve a dry adhesive or shape memory polymer may include alpha, omega-diaminoalkanes, organic multi-caroxylic acid, anhydride, or catalytic (as in imidazole type) crosslinking reactions. There are many different ways to achieve the appropriate relationships between the molecular properties. For example, the dry adhesives or shape memory polymers may include a rigid epoxy, an epoxy extender, and a crosslinking agent; or a rigid epoxy, a flexible crosslinking agent, and a flexible epoxy; or a rigid epoxy, a rigid crosslinking agent, and a flexible epoxy; or a rigid epoxy, a flexible epoxy, and a catalytic curing agent; or a rigid epoxy, a crosslinking agent, and a diluent; or a flexible epoxy, a crosslinking agent, and a diluent; or a rigid epoxy and a flexible crosslinking agent; or a flexible epoxy and a catalytic curing agent; or a flexible epoxy and a crosslinking agent; and wherein the rigid epoxy is an aromatic epoxy having at least two epoxide groups, the flexible epoxy is an aliphatic epoxy having at least two epoxide groups, the epoxy extender has one epoxide group, and the crosslinking agent is one of a multi-amine, an organic multi-carboxylic acid, or an anhydride, and the diluent is a monoamine or a mono-carboxylic acid. In various embodiments, the catalytic curing agent (or catalytic cure) promotes epoxy-to-epoxy or epoxy-to-hydroxyl reactions. The catalytic curing agent may include, but is not limited to, tertiary amines, amine salts, boron trifluoride complexes, or amine borates. In one embodiment, the components of the dry adhesive may be present in an amount sufficient to provide, upon curing of the composition, a dry adhesive having a glass transition temperature ($T_g$) of −90° C. to 200° C. and having a pull-off strength of 1-200 N/cm² from a substrate. In another embodiment, the dry adhesive may have a glass transition temperature of −90° C. to 25° C. In one embodiment, the components of the shape memory polymer composition may be present in an amount sufficient to provide, upon curing of the composition, an epoxy shape memory polymer having a change in storage modulus of 2 to 3 orders of magnitude before and after its glass transition.

One embodiment of the invention includes a multilayer thermo-reversible dry adhesive having a first layer made from an aromatic diepoxide (rigid epoxy), an aliphatic diepoxy (flexible epoxy), and a diamine curing agent, and a second layer made from an aliphatic diepoxy and an amine. In one embodiment the multilayer thermo-reversible dry adhesive has a curved structure.

Numerous shape memory polymers may be utilized in various embodiments of the invention. For example, starting with a typical aromatic diepoxy/diamine system with a $T_g$ of about 90° C., the aromatic epoxy component is replaced systematically with an aliphatic diepoxy to yield a series of epoxy shape memory polymers with $T_g$'s ranging from 3° C. to 90° C. As such, a shape memory polymer may be tailored for use with a dry adhesive as desired for a particular application operated within certain temperature ranges.

Some embodiments refer to a multilayer epoxy dry adhesive. It should be understood that more than two layers may be utilized. For example, there may be two or more layers of the shape memory polymer layer, which may be in a side by side relationship or an overlying relationship. Likewise, there may be two or more dry adhesive layers in a side by side relationship or an overlying relationship. As such, a device with custom or tailored properties may be manufactured.

One embodiment of the invention includes a method of making a multilayer thermo-reversible dry adhesive comprising heating 3.6 g of EPON 826 (the diglycidyl ether of bisphenol A epoxy monomer) to about 75° C. and mixing the same with 2.16 g of neopentyl glycol diglycidyl ether (NGDE) and 2.3 g of Jeffamine D-230, which is the curing agent poly(propylene glycol)bis(2-aminopropyl)ether. Jeffamine D-230 is a polyetheramine that is difunctional, primary amine with an average molecular weight of about 230. The primary amine groups are located on secondary carbons at the end of the aliphatic polyether chain. Jeffamine is available from Huntsman.

The mixture was then poured into an aluminum pan and cured in an oven at about 100° C. for 1.5 hours. Then a mixture of 2.6 g of NGDE and 1.15 g of an amine such as Jeffamine D-230 was poured into the aluminum pan on top of the first cured epoxy layer and cured for 1.5 hours at 100° C. In a third step, the oven temperature was raised to 130° C. for post-curing for about one hour. At the end of the post-curing, the cured two-layer epoxy was demolded. A double layer epoxy was obtained with the first layer which had a thickness of about 2 mm and functioned as a shape memory polymer with a glass transition of about 45° C. and a second layer as a dry adhesive having a thickness of about 1 mm. The yielded double layer epoxy structure had a slightly curved structure due to the thermal mismatch between the first and second layers. This curvature can also be created by specifically designed molds to achieve the curved structure.

The above description of embodiments of the invention is merely exemplary in nature and, thus, variations thereof are not to be regarded as a departure from the spirit and scope of the invention.

What is claimed is:

1. A method comprising:
   providing a climbing device including at least one movable arm or leg and an attachment pad attached thereto comprising a thermo-reversible dry adhesive comprising a shape memory polymer layer, and a dry adhesive layer over the shape memory polymer layer, a means for heating and cooling the thermo-reversible dry adhesive, and a means for applying pressure to the thermo-reversible dry adhesive comprising a spring; wherein shape recovery of the shape memory polymer layer is not constrained by the device;
   heating the thermo-reversible dry adhesive so that the shape memory polymer is at a temperature above its glass transition temperature, and placing the attachment pad on a wall and applying pressure to the thermo-reversible dry adhesive through the spring, and cooling the thermo-reversible dry adhesive so that the attachment pad is attached to the wall; and
   detaching the pad from the wall comprising heating the thermo-reversible dry adhesive layer and applying a relatively small pull-off or peel-off force to remove the pad from the wall.

2. A method as set forth in claim 1 wherein the shape memory polymer layer and the overlying dry adhesive layer each have a curved surface when the shape memory polymer layer is in an original shape at a temperature below the glass transition temperature thereof and without a load applied thereto.

3. A method comprising:
   providing a climbing device including at least one movable arm or leg and an attachment pad attached thereto comprising a thermo-reversible dry adhesive comprising a shape memory polymer layer, and a dry adhesive layer over the shape memory polymer layer, a means for heating and cooling the thermo-reversible dry adhesive, and a means for applying pressure to the thermo-reversible dry adhesive comprising a spring;
   heating the thermo-reversible dry adhesive so that the shape memory polymer is at a temperature above its glass transition temperature, and placing the attachment pad on a wall and applying pressure to the thermo-reversible dry adhesive through the spring, and cooling the thermo-reversible dry adhesive so that the attachment pad is attached to the wall; and
   detaching the pad from the wall comprising heating the thermo-reversible dry adhesive layer and applying a relatively small pull-off or peel-off force to remove the pad from the wall;
   wherein the shape memory polymer layer comprises:
     at least one of a rigid epoxy or a flexible epoxy; and
     at least one of a crosslinking agent or a catalytic curing agent;
     and wherein the rigid epoxy is an aromatic epoxy having at least two epoxide groups, the flexible epoxy is an aliphatic epoxy having at least two epoxide groups, and the crosslinking agent is one of a multi-amine, an organic multi-carboxylic acid, or an anhydride.

4. A method comprising:
   providing a climbing device including at least one movable arm or leg and an attachment pad attached thereto comprising a thermo-reversible dry adhesive comprising a shape memory polymer layer, and a dry adhesive layer over the shape memory polymer layer, a means for heating and cooling the thermo-reversible dry adhesive, and a means for applying pressure to the thermo-reversible dry adhesive comprising a spring;
   heating the thermo-reversible dry adhesive so that the shape memory polymer is at a temperature above its glass transition temperature, and placing the attachment pad on a wall and applying pressure to the thermo-reversible dry adhesive through the spring, and cooling the thermo-reversible dry adhesive so that the attachment pad is attached to the wall; and detaching the pad from the wall comprising heating the thermo-reversible dry adhesive layer and applying a relatively small pull-off or peel-off force to remove the pad from the wall;
wherein the dry adhesive layer comprises:
at least one of a rigid epoxy or a flexible epoxy; and
at least one of a crosslinking agent or a catalytic curing agent;
wherein the rigid epoxy is an aromatic epoxy having at least two epoxide groups, the flexible epoxy is an aliphatic epoxy having at least two epoxide groups, and the crosslinking agent is one of a multi-amine, an organic multi-carboxylic acid, or an anhydride.

5. A method as set forth in claim 1 wherein the attachment pad further comprises at least one other spring, and a bridge connecting said springs for applying an even load to the perimeter of the multilayer thermo-reversible adhesive.

6. A method as set forth in claim 5 wherein the attachment pad further comprises a rod connected to the bridge for applying a load to the bridge.

7. A method as set forth in claim 1 wherein the means for heating comprises a heating element in the spring.

* * * * *